(No Model.)  2 Sheets—Sheet 1.
W. J. DENNIS.
PLANT AND TREE CULTURE APPARATUS.
No. 349,087.  Patented Sept. 14, 1886.
Fig. 1.
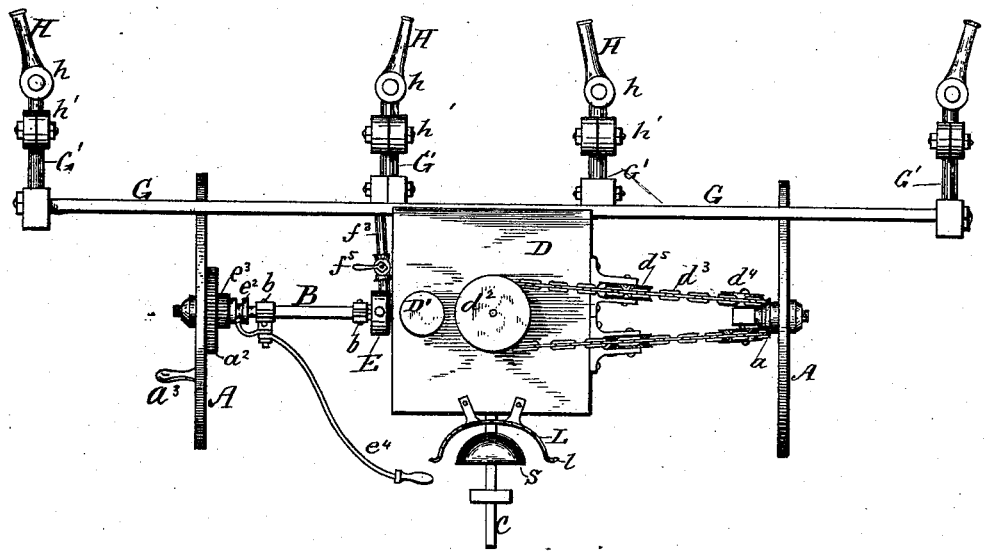
Fig. 2.
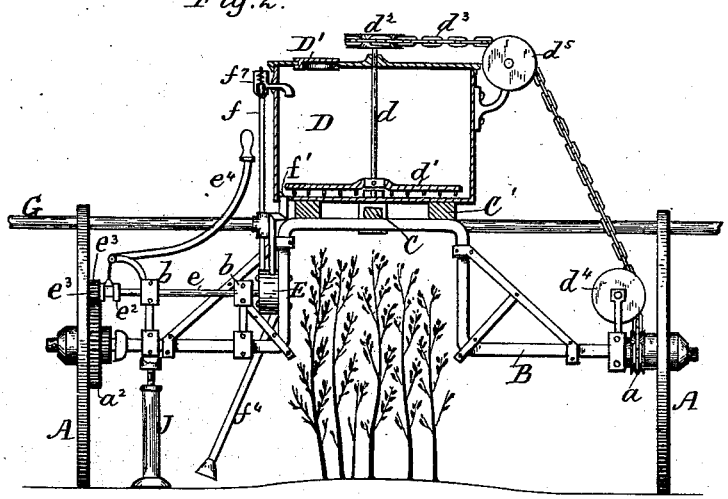
Fig. 3.
Witnesses:
E. C. Wurdeman
W. B. Masson
Inventor:
Wilbert J. Dennis
by E. E. Masson
atty.

(No Model.) 2 Sheets—Sheet 2.

W. J. DENNIS.
PLANT AND TREE CULTURE APPARATUS.

No. 349,087. Patented Sept. 14, 1886.

Witnesses:
E. C. Vandeman
W. B. Masson

Inventor:
Wilbert J. Dennis
by E. E. Masson
atty.

United States Patent Office.

WILBERT J. DENNIS, OF AUGUSTA, GEORGIA.

PLANT AND TREE CULTURE APPARATUS.

SPECIFICATION forming part of Letters Patent No. 349,087, dated September 14, 1886.

Application filed January 19, 1886. Serial No. 189,084. (No model.)

*To all whom it may concern:*

Be it known that I, WILBERT J. DENNIS, a citizen of the United States, residing at Augusta, in the county of Richmond and State of Georgia, have invented certain new and useful Improvements in Plant and Tree Culture Apparatus, of which the following is a specification, reference being had therein to the accompanying drawings.

My invention relates to improvements in the construction of apparatus for the destruction of insects in the foliage of plants and trees by injecting upon said plants a suitable insecticide fluid; and the objects of my improvements are to provide, in connection with a tank, a vehicle provided with a bent axle capable of passing over tall plants without injury; second, to provide the vehicle and tank with means for forcing into or from the latter a continuous stream of a suitable liquid; third, to protect the driver from any spray of said liquid. I attain these objects by the apparatus illustrated in accompanying drawings, in which—

Figure 4:
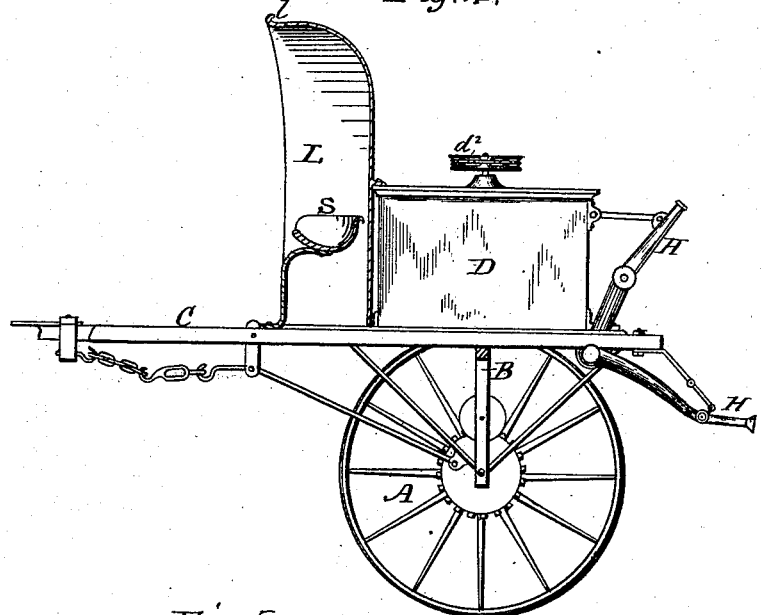
Figure 5:
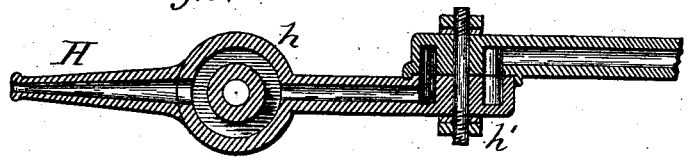
Figure 6:
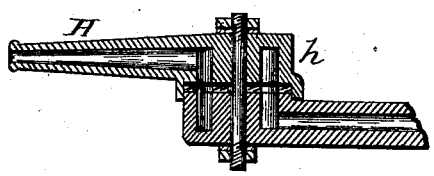
Figure 7:
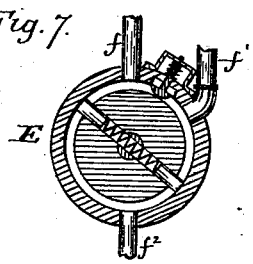

Figure 1 is a top view of the apparatus constructed in accordance with my invention. Fig. 2 is a transverse vertical section of the same. Fig. 3 is a side view of the rotary pump and pipes connected with a portion of the tank. Fig. 4 is a longitudinal vertical section of the apparatus. Fig. 5 is a longitudinal horizontal section of one of the nozzles. Fig. 6 is a vertical section of said nozzle. Fig. 7 is a vertical section of the rotary pump.

Similar letters refer to similar parts throughout the several views.

The driving-wheels A are connected by the axle B, having its central portion bent upward for about one-third of its length to permit it to pass over rows of cotton and other plants without injuring them. To this elevated portion of the axle is secured the tongue C of the vehicle, and also the frame C', that supports the tank D substantially centrally over the axle. This tank is to contain the poisonous liquid used for the destruction of worms, insects, &c., on cotton and other plants, and on bushes and trees, said liquid being preferably a mixture or solution in water of Paris green, London-purple, or other suitable solutions. In the center of the tank is mounted a vertical shaft, $d$, to the lower end of which is secured a horizontal stirrer or rake, $d'$, to continuously stir the ingredients within the tank, the substance being generally admitted into the tank through an opening in the top, that is afterward closed by a cap-plate, D'. To the upper end of the shaft $d$ is secured a pulley, $d^2$, around which is passed an endless chain, $d^3$, that passes also around a pulley, $a$, mounted upon the hub of one of the driving-wheels. Guide-pulleys $d^4$ and $d^5$ are mounted on brackets projecting, respectively, from the upper side of the axle and from the side of the tank to properly direct the chain from the driving-pulley $a$ to the pulley $d^2$.

To fill the tank with water a rotary pump, E, is secured to the vertical portion of the axle B, or to some support alongside thereof. Through the center of the pump passes a horizontal shaft, $e$, supported in bearings $b$ secured to the axle. Upon the outer end of the shaft $e$ is mounted a sleeve, $e^2$, connected therewith with a spline and carrying a pinion, $e^3$. This sleeve and pinion can be made to slide back and forth upon the end of the shaft by means of the hand-lever $e^4$, having its free end within reach of the driver in his seat $s$, and its pivot on a bracket projecting from one of the bearings $b$ of the shaft. The pinion $e^3$ can thus be thrown in and out of gear with the gear-wheel $a^2$ mounted upon the hub of one of the driving-wheels. The rotary pump is provided with three pipes, $f f' f^2$, inserted in its periphery. The pipe $f$ stands vertically above the pump, and has a substantially horizontal branch pipe, $f^3$, leading to the main distributing-pipe G. The pipe $f'$ leads the liquid from the rotary pump to the bottom of the tank D while said tank is to be filled, or from the tank to the pump while the machine is in operation. The pipe $f^2$ is provided with a flexible hose, $f^4$, to take water from any direction by inserting its outer end into a brook, a pond, or any other water-reservoir.

When the tank D is to be filled, the machine is brought alongside of a water-reservoir, and the outer end of the hose $f^4$ inserted therein. One end of the axle B is then elevated a few inches with a lifting-jack, J, or any other suitable device, until the driving-wheel A carrying the gear-wheel $a^2$ is off the ground. It is then rotated by a person taking hold of the handle $a^3$ projecting from the outer side and the pinion $e^3$, and the piston of the pump is thus rapidly rotated until the tank D is nearly full of water, (the cock $f^3$ upon the pipe $f^3$ having been previously closed, and the poisonous mixture introduced into the tank.) The cock $f^6$ is then closed, and the pinion $e^3$ thrown out of gear. The machine is then in proper condition to be driven to a field for operation.

The distributing-pipe G is located immediately in the rear of the tank, and extends beyond the outer side of the wheels a sufficient distance to sprinkle four rows of cotton-plants at a time. From the rear of the distributing-pipe four pipes, G', are projecting, and each one may be provided with a cock, and between the pipe G' and the end of the nozzles H two swiveled joints, $h$ and $h'$, are placed, each one at right angles to the other, so that the outer end of the nozzle can be made to point horizontally or vertically, or in any direction to reach plants of any size.

When the machine is in a field ready for operation, the pinion $e^3$ is put into gear with the cog-wheel $a^2$, and the pump is operated automatically as the apparatus is drawn along. The cock $f^3$ being open, the liquid flows from the tank through the pipes $f'$ into the rotary pump, and from the latter through the pipes $f$ and $f^3$ to the distributing-pipe. To prevent any strain on these pipes in case the diameter of the nozzle is too small, there is placed in the upper end of the pipe $f$ a small chamber, $f^7$, containing a spring-valve, $f^8$, to resist the issue of the liquid at that point until the adjustable pressure of the spring upon said valve has been overcome. The liquid flows then through the spout, issuing from the side of said chamber $f^7$, back into the tank.

To prevent any of the poisonous sprayed liquid falling upon the driver, he is protected by a concavo-convex shield, L, in the form of a niche, with outwardly-curved edges $l$. Said shield partly incloses and overhangs his seat and deflects toward the rear any liquid that may fall thereupon.

Having now fully described my invention, I claim—

1. An apparatus for destroying insects on plants, consisting of two wheels, an upwardly-bent axle connecting them, a tank upon said axle, a horizontally-revolving stirrer in said tank, a rotary pump having three pipes issuing therefrom, and mechanism, substantially as set forth, connected with the hub of each wheel, to operate said stirrer and pump, all combined substantially as described.

2. In an apparatus for destroying insects, the combination of two driving-wheels, an upwardly-bent axle, a tank above said axle, a stirrer therein, a rotary pump having its shaft connected by gearing with the hub of one of the driving-wheels, a pipe leading from the tank into the said pump, and a pipe leading back from said pump into the tank, substantially as and for the purpose described.

3. In an apparatus for destroying insects, the combination of a tank mounted upon the upwardly-bent axle of driving-wheels, a rotary pump having its shaft connected with the hub of one of said wheels and leading back into said tank, and a pipe controlled by a spring-valve at its upper end with a distributing-pipe having nozzles swiveled at two points, substantially as and for the purpose described.

4. In an apparatus for destroying insects, the combination of a tank mounted upon the upwardly-bent axle of driving-wheels, and a rotary pump having a pipe leading back into said tank and controlled by a spring-valve at its upper end, with the driver's seat in front of the tank and the concavo-convex shield for said seat, substantially as and for the purpose described.

In testimony whereof I affix my signature in presence of two witnesses.

WILBERT J. DENNIS.

Witnesses:
C. H. PHINIZY,
PHILIPP C. CLOSE.